United States Patent
Brown et al.

(10) Patent No.: US 10,055,412 B2
(45) Date of Patent: *Aug. 21, 2018

(54) PROVIDING MEDIA ITEMS FROM PLAYBACK HISTORY

(71) Applicant: Sonos, Inc., Santa Barbara, CA (US)

(72) Inventors: Amber Brown, Santa Barbara, CA (US); Mark Triplett, St. Charles, IL (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/613,762

(22) Filed: Jun. 5, 2017

(65) Prior Publication Data

US 2017/0270112 A1    Sep. 21, 2017

Related U.S. Application Data

(63) Continuation of application No. 14/300,564, filed on Jun. 10, 2014, now Pat. No. 9,672,213.

(51) Int. Cl.
*G06F 17/30* (2006.01)
*H04L 29/06* (2006.01)
(Continued)

(52) U.S. Cl.
CPC .......... *G06F 17/3005* (2013.01); *G06F 3/165* (2013.01); *H04L 65/4084* (2013.01);
(Continued)

(58) Field of Classification Search
CPC . G06F 17/3005; G06F 3/165; H04L 65/4084; H04L 67/1095
(Continued)

(56) References Cited

U.S. PATENT DOCUMENTS 5,406,634 A    4/1995 Anderson et al.
5,440,644 A    8/1995 Farinelli et al.
(Continued)

FOREIGN PATENT DOCUMENTS

EP    1389853 A1    2/2004
KR    100890993    3/2009
(Continued)

OTHER PUBLICATIONS

Advisory Action dated Sep. 16, 2015, issued in connection with U.S. Appl. No. 13/338,724, filed Dec. 28, 2011, 3 pages.
(Continued)

*Primary Examiner* — Hanh B Thai
(74) *Attorney, Agent, or Firm* — McDonnell Boehnen Hulbert & Berghoff LLP

(57) ABSTRACT

Examples provided herein involve a playback history for media items played by playback zones of a media playback system. An example implementation involves a computing device storing a playback history of media items played by the media playback system, the playback history including, for each of the media items, an indication of a playback zone in which the media item was played, a time at which the media item was played, and metadata of the media item. The implementation also involves receiving a request for media items played during a given time period by the one or more playback zones; and based on the request, transmitting, to the media playback system, a portion of the playback history. Transmitting the portion of the playback history causes an indication of particular media items played by the one or more playback zones during the given time period to be displayed.

18 Claims, 5 Drawing Sheets

(51) Int. Cl.
*H04L 29/08* (2006.01)
*G06F 3/16* (2006.01)
*H04N 21/472* (2011.01)

(52) U.S. Cl.
CPC .......... *H04L 67/1095* (2013.01); *H04L 67/12* (2013.01); *H04L 67/22* (2013.01); *H04L 67/30* (2013.01); *H04N 21/47217* (2013.01); *H04L 67/1097* (2013.01)

(58) Field of Classification Search
USPC ........................................................ 707/769
See application file for complete search history.

(56) References Cited

U.S. PATENT DOCUMENTS

| | | |
|---|---|---|
| 5,761,320 A | 6/1998 | Farinelli et al. |
| 5,856,827 A | 1/1999 | Sudo |
| 5,923,902 A | 7/1999 | Inagaki |
| 6,002,862 A | 12/1999 | Takaike |
| 6,029,195 A | 2/2000 | Herz |
| 6,032,202 A | 2/2000 | Lea et al. |
| 6,108,686 A | 8/2000 | Williams, Jr. |
| 6,181,316 B1 | 1/2001 | Little et al. |
| 6,255,961 B1 | 7/2001 | Van Ryzin et al. |
| 6,256,554 B1 | 7/2001 | Dilorenzo |
| 6,349,339 B1 | 2/2002 | Williams |
| 6,404,811 B1 | 6/2002 | Cvetko et al. |
| 6,469,633 B1 | 10/2002 | Wachter |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,728,531 B1 | 4/2004 | Lee et al. |
| 6,732,155 B2 | 5/2004 | Meek |
| 6,757,517 B2 | 6/2004 | Chang |
| 6,778,869 B2 | 8/2004 | Champion |
| 6,826,283 B1 | 11/2004 | Wheeler et al. |
| 6,985,694 B1 | 1/2006 | De Bonet et al. |
| 7,017,118 B1 | 3/2006 | Carroll |
| 7,020,048 B2 | 3/2006 | McComas |
| 7,113,833 B1 | 9/2006 | Brown et al. |
| 7,117,451 B2 | 10/2006 | Sielken |
| 7,124,125 B2 | 10/2006 | Cook et al. |
| 7,130,608 B2 | 10/2006 | Hollstrom |
| 7,130,616 B2 | 10/2006 | Janik |
| 7,143,939 B2 | 12/2006 | Henzerling |
| 7,187,947 B1 | 3/2007 | White et al. |
| 7,236,739 B2 | 6/2007 | Chang |
| 7,236,773 B2 | 6/2007 | Thomas |
| 7,295,548 B2 | 11/2007 | Blank et al. |
| 7,312,785 B2 | 12/2007 | Tsuk et al. |
| 7,358,960 B2 | 4/2008 | Mak |
| 7,391,791 B2 | 6/2008 | Balassanian et al. |
| 7,483,538 B2 | 1/2009 | McCarty et al. |
| 7,496,623 B2 | 2/2009 | Szeto et al. |
| 7,496,633 B2 | 2/2009 | Szeto et al. |
| 7,571,014 B1 | 8/2009 | Lambourne et al. |
| 7,580,325 B2 | 8/2009 | Welk et al. |
| 7,599,685 B2 | 10/2009 | Goldberg et al. |
| 7,630,501 B2 | 12/2009 | Blank et al. |
| 7,643,894 B2 | 1/2010 | Braithwaite et al. |
| 7,657,224 B2 | 2/2010 | Goldberg et al. |
| 7,657,910 B1 | 2/2010 | McAulay et al. |
| 7,725,533 B2 | 5/2010 | Szeto et al. |
| 7,725,551 B2 | 5/2010 | Szeto et al. |
| 7,739,271 B2 | 6/2010 | Cook et al. |
| 7,739,596 B2 | 6/2010 | Clarke-Martin et al. |
| 7,742,740 B2 | 6/2010 | Goldberg et al. |
| 7,774,078 B2 | 8/2010 | Booth et al. |
| 7,805,682 B1 | 9/2010 | Lambourne |
| 7,835,689 B2 | 11/2010 | Goldberg et al. |
| 7,853,341 B2 | 12/2010 | McCarty et al. |
| 7,865,137 B2 | 1/2011 | Goldberg et al. |
| 7,912,565 B2 | 3/2011 | Tazine et al. |
| 7,916,877 B2 | 3/2011 | Goldberg et al. |
| 7,917,082 B2 | 3/2011 | Goldberg et al. |
| 7,962,482 B2 | 6/2011 | Handman et al. |
| 7,987,294 B2 | 7/2011 | Bryce et al. |
| 7,987,426 B2 | 7/2011 | Cotter et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,074,253 B1 | 12/2011 | Nathan |
| 8,103,009 B2 | 1/2012 | McCarty et al. |
| 8,131,390 B2 | 3/2012 | Braithwaite et al. |
| 8,135,669 B2 | 3/2012 | Olstad et al. |
| 8,214,873 B2 | 7/2012 | Weel |
| 8,230,099 B2 | 7/2012 | Weel |
| 8,234,395 B2 | 7/2012 | Millington et al. |
| 8,392,468 B2 | 3/2013 | Sato |
| 8,483,853 B1 | 7/2013 | Lambourne |
| 8,762,843 B2 | 6/2014 | Morse et al. |
| 8,910,265 B2 | 12/2014 | Lang et al. |
| 8,942,252 B2 | 1/2015 | Balassanian et al. |
| 9,137,564 B2 | 9/2015 | Reimann |
| 9,232,277 B2 | 1/2016 | Vega et al. |
| 9,245,020 B2 | 1/2016 | Joffray et al. |
| 9,247,363 B2 | 1/2016 | Triplett et al. |
| 9,286,384 B2 | 3/2016 | Kuper et al. |
| 9,374,607 B2 | 6/2016 | Bates et al. |
| 9,478,247 B2 | 10/2016 | Chen et al. |
| 9,501,533 B2 | 11/2016 | Coburn et al. |
| 9,524,338 B2 | 12/2016 | Van Der Heide et al. |
| 9,547,647 B2 | 1/2017 | Badaskar et al. |
| 9,665,339 B2 | 5/2017 | Reimann et al. |
| 9,705,950 B2 * | 7/2017 | Trammell ........ H04N 21/25841 |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0056117 A1 | 5/2002 | Hasegawa et al. |
| 2002/0124097 A1 | 9/2002 | Isely et al. |
| 2002/0163361 A1 | 11/2002 | Parkin |
| 2002/0165921 A1 | 11/2002 | Sapieyevski |
| 2002/0178191 A1 | 11/2002 | Sielken |
| 2003/0023741 A1 | 1/2003 | Tomassetti et al. |
| 2003/0073432 A1 | 4/2003 | Meade |
| 2003/0157951 A1 | 8/2003 | Hasty |
| 2003/0210796 A1 | 11/2003 | McCarty et al. |
| 2003/0221541 A1 | 12/2003 | Platt |
| 2004/0024478 A1 | 2/2004 | Hans et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0088328 A1 | 5/2004 | Cook et al. |
| 2004/0215611 A1 | 10/2004 | Jawa et al. |
| 2004/0261040 A1 | 12/2004 | Radcliffe et al. |
| 2005/0108320 A1 | 5/2005 | Lord et al. |
| 2005/0166157 A1 | 7/2005 | Ollis et al. |
| 2006/0107237 A1 | 5/2006 | Kim |
| 2006/0168340 A1 | 7/2006 | Heller et al. |
| 2006/0253436 A1 | 11/2006 | Cook et al. |
| 2006/0253782 A1 | 11/2006 | Stark et al. |
| 2007/0025194 A1 | 2/2007 | Morse et al. |
| 2007/0038999 A1 | 2/2007 | Millington et al. |
| 2007/0088747 A1 | 4/2007 | Cheng et al. |
| 2007/0142944 A1 | 6/2007 | Goldberg et al. |
| 2007/0214106 A1 | 9/2007 | Johnston et al. |
| 2007/0239562 A1 | 10/2007 | Lawson |
| 2007/0266843 A1 | 11/2007 | Schneider |
| 2007/0288470 A1 | 12/2007 | Kauniskangas et al. |
| 2007/0294131 A1 | 12/2007 | Roman et al. |
| 2008/0005690 A1 | 1/2008 | Van Vugt |
| 2008/0016465 A1 | 1/2008 | Foxenford |
| 2008/0052371 A1 | 2/2008 | Partovi et al. |
| 2008/0066102 A1 | 3/2008 | Abraham et al. |
| 2008/0086750 A1 | 4/2008 | Yasrebi et al. |
| 2008/0131085 A1 | 6/2008 | Ikeda et al. |
| 2008/0155588 A1 | 6/2008 | Roberts et al. |
| 2008/0250328 A1 | 10/2008 | Konttinen |

(56) References Cited

U.S. PATENT DOCUMENTS

| | | |
|---|---|---|
| 2009/0031254 A1 | 1/2009 | Herpel et al. |
| 2009/0063975 A1 | 3/2009 | Bull et al. |
| 2009/0106297 A1 | 4/2009 | Wright et al. |
| 2009/0157680 A1 | 6/2009 | Crossley et al. |
| 2009/0171715 A1 | 7/2009 | Conley et al. |
| 2009/0228919 A1 | 9/2009 | Zott et al. |
| 2009/0234878 A1 | 9/2009 | Herz et al. |
| 2009/0249222 A1 | 10/2009 | Schmidt et al. |
| 2009/0292819 A1 | 11/2009 | Kandekar et al. |
| 2009/0307062 A1 | 12/2009 | Lutnick et al. |
| 2010/0017366 A1 | 1/2010 | Robertson et al. |
| 2010/0082641 A1 | 4/2010 | Rinckes et al. |
| 2010/0205222 A1 | 8/2010 | Gajdos et al. |
| 2010/0235741 A1 | 9/2010 | Newman et al. |
| 2010/0262909 A1 | 10/2010 | Hsieh |
| 2010/0268360 A1 | 10/2010 | Ingrassia et al. |
| 2010/0281369 A1 | 11/2010 | Bell et al. |
| 2010/0293187 A1 | 11/2010 | Biehn et al. |
| 2011/0004330 A1 | 1/2011 | Rothkopf et al. |
| 2011/0106954 A1 | 5/2011 | Chatterjee et al. |
| 2011/0131272 A1 | 6/2011 | Littlejohn et al. |
| 2011/0154198 A1 | 6/2011 | Bachman et al. |
| 2011/0161348 A1 | 6/2011 | Oron |
| 2012/0023099 A1 | 1/2012 | Crossley et al. |
| 2012/0054233 A1 | 3/2012 | Svendsen et al. |
| 2012/0059914 A1 | 3/2012 | Banger et al. |
| 2012/0071996 A1 | 3/2012 | Svendsen |
| 2012/0089910 A1 | 4/2012 | Cassidy |
| 2012/0117017 A1 | 5/2012 | Phillips et al. |
| 2012/0117586 A1 | 5/2012 | McCoy et al. |
| 2012/0150614 A1 | 6/2012 | Dion et al. |
| 2012/0254256 A1 | 10/2012 | Martin |
| 2012/0254363 A1 | 10/2012 | Martin et al. |
| 2013/0148720 A1 | 6/2013 | Rabii |
| 2013/0173034 A1 | 7/2013 | Reimann et al. |
| 2013/0219273 A1 | 8/2013 | Coburn |
| 2013/0254207 A1 | 9/2013 | Coburn, IV et al. |
| 2013/0343567 A1 | 12/2013 | Triplett et al. |
| 2013/0347018 A1 | 12/2013 | Limp et al. |
| 2014/0005813 A1 | 1/2014 | Reimann |
| 2014/0129015 A1 | 5/2014 | Lindahl et al. |
| 2014/0149553 A1 | 5/2014 | Bank et al. |
| 2014/0181199 A1 | 6/2014 | Kumar et al. |
| 2014/0181654 A1 | 6/2014 | Kumar et al. |
| 2014/0181655 A1 | 6/2014 | Kumar et al. |
| 2014/0277639 A1 | 9/2014 | Gomes-Casseres et al. |
| 2014/0368737 A1 | 12/2014 | Hoffert et al. |
| 2015/0095170 A1 | 4/2015 | Lang et al. |
| 2015/0095323 A1 | 4/2015 | Bates |
| 2015/0253960 A1 | 9/2015 | Lin et al. |
| 2015/0286461 A1* | 10/2015 | Trammell .......... H04N 21/8456 700/94 |
| 2015/0310009 A1 | 10/2015 | Van Der Heide |
| 2015/0312299 A1 | 10/2015 | Chen |

FOREIGN PATENT DOCUMENTS

| | | |
|---|---|---|
| WO | 200153994 | 7/2001 |
| WO | 2003093950 A2 | 11/2003 |
| WO | 2012030006 A1 | 3/2012 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Search Report dated Oct. 5, 2017, issued in connection with EP Application No. 15806449.3, 10 pages.
Final Office Action dated Jul. 8, 2015, issued in connection with U.S. Appl. No. 13/338,724, filed Dec. 28, 2011, 15 pages.
First Action Interview Office Action dated Nov. 17, 2016, issued in connection with U.S. Appl. No. 14/300,564, filed Jun. 10, 2014, 3 pages.
International Bureau, International Preliminary Report on Patentability dated Apr. 3, 2014, issued in connection with International Application No. PCT/US2012/056467, filed Sep. 21, 2011, 11 pages.
International Bureau, International Preliminary Report on Patentability dated Dec. 22, 2016, issued in connection with International Application No. PCT/US2015/032169, filed May 22, 2015, 7 pages.
International Searching Authority, International Search Report and Written Opinion dated Oct. 8, 2015, issued in connection with International Application No. PCT/US2015/032169, filed May 22, 2015, 10 pages.
International Searhing Authority, International Search Report and Written Opinion dated Feb. 28, 2013, issued in connection with International Application No. PCT/US2012/056467, filed Sep. 21, 2012, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Nov. 1, 2017, issued in connection with U.S. Appl. No. 15/205,479, filed Jul. 8, 2016, 7 pages.
Non-Final Office Action dated Oct. 6, 2016, issued in connection with U.S. Appl. No. 13/338,724, filed Dec. 28, 2011, 15 pages.
Non-Final Office Action dated Nov. 21, 2014, issued in connection with U.S. Appl. No. 13/338,724, filed Dec. 28, 2011, 18 pages.
Non-Final Office Action dated Dec. 28, 2017, issued in connection with U.S. Appl. No. 15/205,753, filed Jul. 8, 2016, 7 pages.
Notice of Allowance dated Apr. 11, 2017, issued in connection with U.S. Appl. No. 13/338,724, filed Dec. 28, 2011, 8 pages.
Notice of Allowance dated Mar. 23, 2017, issued in connection with U.S. Appl. No. 14/300,564, filed Jun. 10, 2014, 14 pages.
Office Communicaiton dated Nov. 8, 2016, issued in connection with U.S. Appl. No. 14/300,564, filed Jun. 10, 2014, 3 pages.
Palm, Inc., "Handbook for the Palm VII Handheld," May 2000, 311 pages.
Preinterview First Office Action dated Nov. 1, 2016, issued in connection with U.S. Appl. No. 14/300,564, filed Jun. 10, 2014, 5 pages.
Presentations at WinHEC 2000, May 2000, 138 pages.
PRISMIQ, Inc., "PRISMIQ Media Player User Guide," 2003, 44 pages.
U.S. Appl. No. 60/490,768 filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.

(56) References Cited

OTHER PUBLICATIONS

Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.

Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

| Track Title | Track Artist | Track Genre | Playback Zone | Playback Time |
|---|---|---|---|---|
| Track 1 | Artist 1 | Genre 1 | Living Room | Sunday, 10:34am |
| Track 2 | Artist 2 | Genre 2 | Dining Room | Saturday, 9:03pm |
| Track 3 | Artist 1 | Genre 1 | Living Room | Sunday 10:50am |
| Track 4 | Artist 1 | Genre 1 | Living Room | Sunday 10:29am |
| Track 5 | Artist 3 | Genre 1 | Living Room | Sunday 10:53am |
| Track 6 | Artist 2 | Genre 2 | Dining Room | Saturday, 9:15pm |
| Track 7 | Artist 3 | Genre 1 | Living Room | Sunday 10:46am |
| Track 8 | Artist 3 | Genre 1 | Living Room | Sunday 10:39am |
| Track 9 | Artist 1 | Genre 1 | Office | Monday 9:15am |
| Track 10 | Artist 4 | Genre 3 | Office | Saturday 9:21pm |
| Track 11 | Artist 5 | Genre 1 | Office | Monday 9:18am |
| . | . | . | . | . |
| . | . | . | . | . |
| . | . | . | . | . |

PROVIDING MEDIA ITEMS FROM PLAYBACK HISTORY

CROSS REFERENCE TO RELATED APPLICATIONS

This application claims priority under 35 U.S.C. § 120 to, and is a continuation of, U.S. non-provisional patent application Ser. No. 14/300,564, filed on Jun. 10, 2014, entitled "Providing Media Items from Playback History," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 6 shows an illustrative representation of an example playback history.

Figure 1:
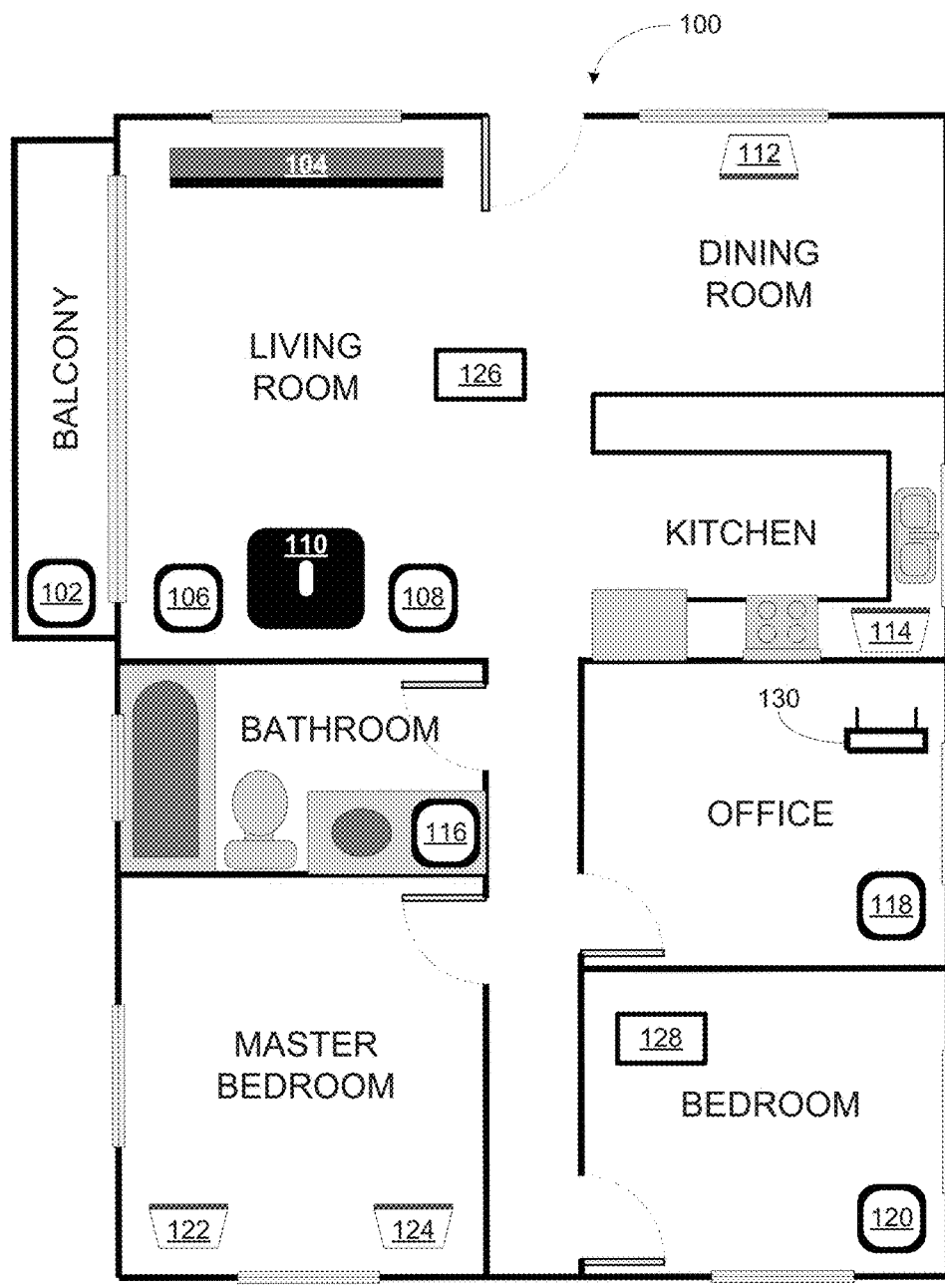
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some examples described herein involve a computing device maintaining a playback history for media items played by a media playback system, and based on a request, providing portions of the playback history.

For each media item played by the media playback system, the playback history may include one or more of (i) an indication of a playback zone in which the media item was played, (ii) a time at which the media item was played, and (iii) metadata associated with the media item, among other information. The metadata may include, among other information, an album associated with the media item, a genre associated with the media item, and/or a track name associated with the media item.

The request may indicate one or more of a playback zone, a time, and metadata associated with one or more playbacks of media items by the media playback system. The request may be received by the computing device via a controller interface for the media playback system. In one example, the request may indicate a playback zone of "Kitchen" and a time of "Morning." Based on the request, a portion of the playback history corresponding to media items that were played in the Kitchen zone, between 6 am and noon, may be identified.

The portion of the playback history that was identified may then be provided by the computing device to the controller interface for display and/or transmitted by the computing device to one or more playback devices such that the corresponding media items may be played by one or more playback zones in the media playback system. In one example, playing of the corresponding media items may involve adding the portion of the playback history to a playback queue associated with the one or more playback zones. Other examples also exist.

As indicated above, the examples provided herein involve maintaining a playback history for media items played by a media playback system, and based on a request, providing portions of the playback history. In one aspect, a method is provided. The method involves maintaining, by a computing device, a playback history for media items played by a media playback system. The media playback system comprises one or more playback zones. The playback history comprises, for each of the media items, (i) an indication of a playback zone in which the media item was played, (ii) a time at which the media item was played, and (iii) metadata associated with the media item. The metadata comprises at least one of an album associated with the media item, a genre associated with the media item, and a track name associated with the media item. The method also involves receiving, by the computing device, a request, and based on the request, transmitting, by the computing device, a portion of the playback history. The portion of the playback history identifies media items played by one of the playback zones at a given time.

In another aspect, a computing device is provided. The computing device includes a processor, and memory having stored thereon instructions executable by the processor to cause the device to perform functions. The functions include maintaining, by a computing device, a playback history for media items played by a media playback system. The media playback system comprises one or more playback zones. The playback history comprises, for each of the media items, (i) an indication of a playback zone in which the media item was played, (ii) a time at which the media item was played, and (iii) metadata associated with the media item. The metadata comprises at least one of an album associated with the media item, a genre associated with the media item, and a track name associated with the media item. The functions also include receiving, by the computing device, a request, and based on the request, transmitting, by the computing device, a portion of the playback history. The portion of the playback history identifies media items played by one of the playback zones at a given time.

In yet another aspect, a non-transitory computer readable memory is provided. The non-transitory computer readable memory has stored thereon instructions executable by a computing device to cause the computing device to perform functions. The functions include maintaining, by a computing device, a playback history for media items played by a media playback system. The media playback system comprises one or more playback zones. The playback history comprises, for each of the media items, (i) an indication of a playback zone in which the media item was played, (ii) a time at which the media item was played, and (iii) metadata associated with the media item. The metadata comprises at least one of an album associated with the media item, a genre associated with the media item, and a track name associated with the media item. The functions also include receiving, by the computing device, a request, and based on the request, transmitting, by the computing device, a portion of the playback history. The portion of the playback history identifies media items played by one of the playback zones at a given time.

It will be understood by one of ordinary skill in the art that this disclosure includes numerous other embodiments. While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
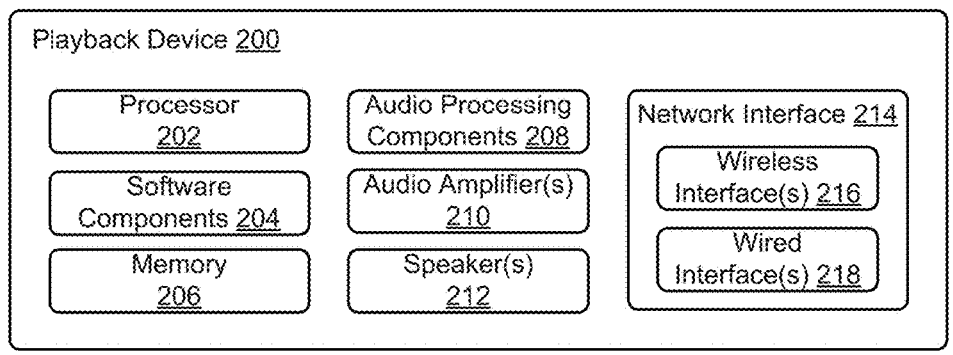
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
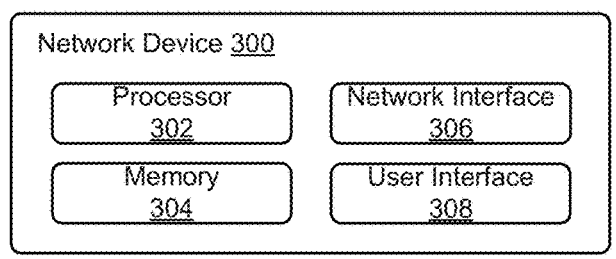
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
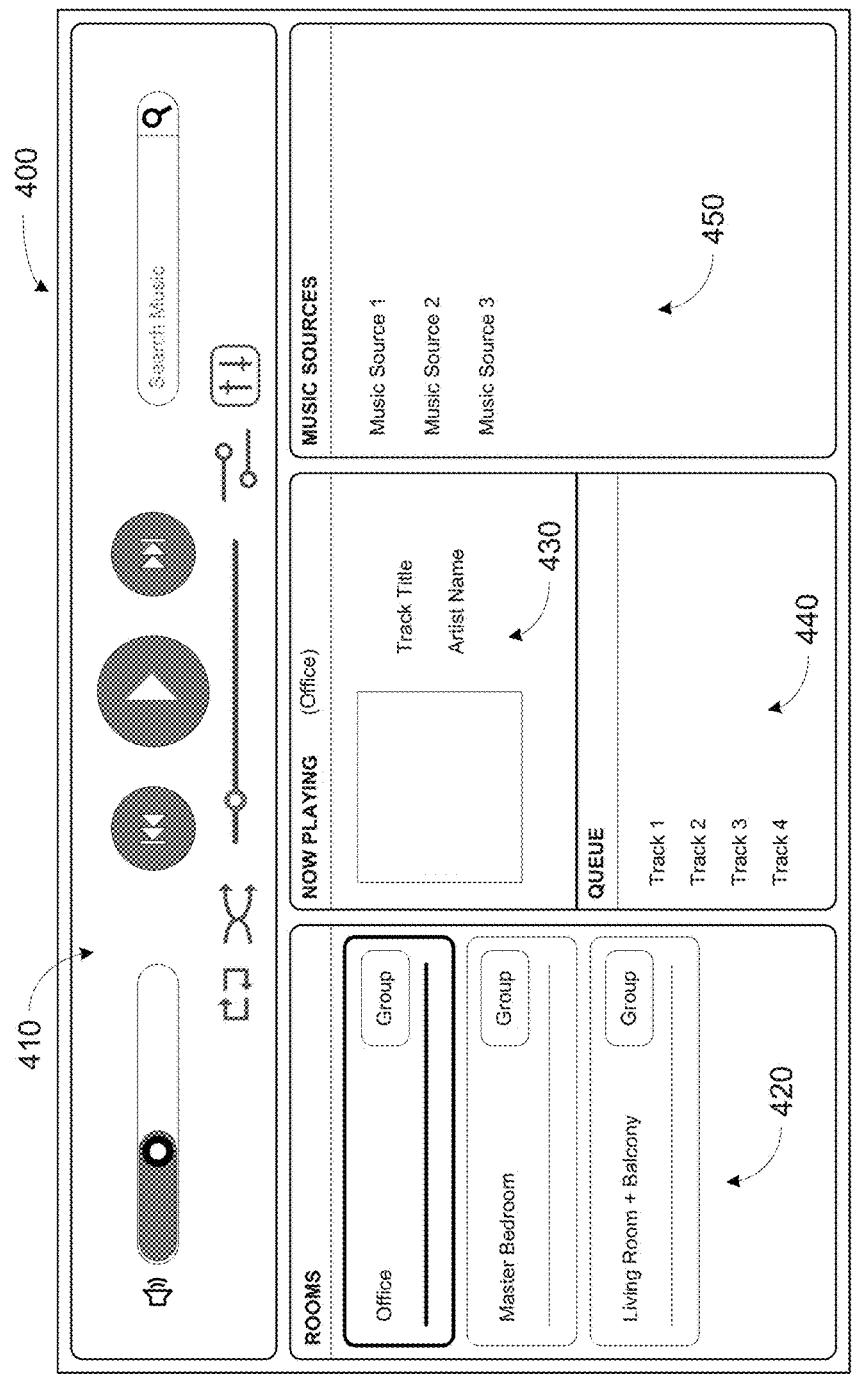
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Providing Media Items from Playback History

Figure 5:
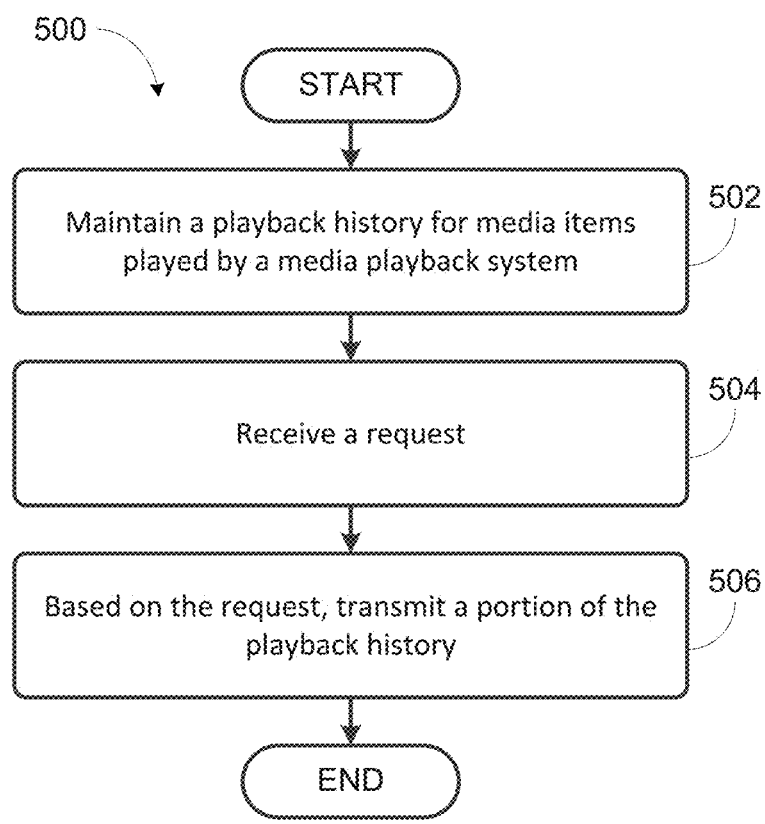
FIG. 5 shows an example flow diagram for providing media items from playback history.

As discussed above, some embodiments described herein involve maintaining a playback history for media items played by a media playback system, and based on a request, providing portions of the playback history. FIG. 5 shows an example method 500 for providing media items from playback history. Method 500 shown in FIG. 5 presents an embodiment of a method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-506. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

As shown, the method 500 involves maintaining a playback history for media items played by a media playback system at block 502, receiving a request at block 504, and based on the request, transmitting a portion of the playback history at block 506. The method 500 is performed by a computing device. In one example, the computing device may be a playback device that is part of the media playback system. For instance, the playback device may be one of the playback devices described above in connection to FIGS. 1-3. In another example, the computing device may include a server device remote from the media playback system. The server device may be a server that is associated with the media playback system, and may store information relating to the media playback system. Such information may include playback device information, playback zone information, service provider association information, and/or user account information, among other information.

a. Maintaining a Playback History for Media Items Played by a Media Playback System At block 502, the method 500 involves maintaining, by a computing device, a playback history for media items played by a media playback system. In one example, the media playback system may be the media playback system 100 discussed above, or a media playback system similar to the media playback system 100. Accordingly, the media playback system includes one or more playback zones. In discussions herein, media items played by the media playback system may include media items added to a playback queue and played by the media playback system, as well as media items provided from internet radio channels. In either case, the media playback system may receive metadata identifying the media items being played.

In one example, the playback history may be maintained as a table or database of indices for media items played by the media playback system. The playback history may be stored at least partially on one or more playback devices in the media playback system, and/or one or more remote server devices associated with the media playback system. In one example, a subset of the playback history identifying media items played in a certain playback zone may be stored on a playback device in the playback zone, while the playback history for the media playback system, including the subset of the playback history, may be stored on the one or more remote server devices. In another example, the playback history, or a portion of the playback history may be stored on a controller device for the media playback system. In a further example, the playback history, or a portion of the playback history may be stored on one or more local server devices. Other examples are also possible.

The playback history for media items played by the media playback system may include, for each of the played media items, (i) an indication of a zone in which the media item was played, (ii) a time at which the media item was played, and (iii) metadata associated with the media item. The metadata may include, among others, an album associated with the media item, a genre associated with the media item, and/or a track name associated with the media item.

FIG. 6 shows an illustrative representation of an example playback history 600. The example playback history 600 includes columns for Track Title, Track Artist, Track Genre, Playback Zone, and Playback Time. For a particular media item, information in the Track Title column identifies a title for a particular media item, information in the Track Artist column identifies an artist for the particular media item, information in the Track Genre column identifies a genre of the particular media item, information in the Playback Zone column identifies a playback zone in which the media item was played, and information in the Playback Time column identifies a given time at which the particular media item was played by the media playback system.

As shown, the information in the Playback Zone column identifies a single playback zone in which a respective media item was played at a given time. In one example, if the media item was played in a zone group, a separate entry for the respective media item played at the given time may be stored for each playback zone in the zone group. In another example, a single entry for the media item played at the given time may be stored in association with a name of the zone group identified in the Playback Zone column. Other examples are also possible.

As shown, the information in the Playback Time indicates a day, hour, and minute at which a respective media item was played. The information may indicate when playback of the respective media item began. In one example, the information in the Playback Time may further or alternatively indicate, among others, years, months, seasons, and/or weeks when the respective media item was played. In another example, the information in the Playback Time column may indicate a general time frame as opposed to a specific time. For instance, if a particular media item was played on Sunday at 10 am, the corresponding information in the Playback Time column may be "Sunday Morning." Other examples are also possible.

As suggested above, a separate entry for a media item played at a given time may be stored for each playback zone of the zone group in which the media item was played. Likewise, a separate entry for a media item may be stored for each time the media item was played. In one example, if the media item was played at two times that are substantially similar, one of the entries may be discarded. For instance, if the particular media item was played on Sunday at 10:15 am and again the following Sunday at 10:02 am, the second entry may not be stored. Alternatively, the second entry may be stored and the first entry may be discarded. In particular, if the information in the Playback Time column indicates a general time frame, the two instances of the particular media items being played may both be stored as "Sunday Morning." Accordingly, one of the two entries may be discarded. In other words, in some examples, duplicative entries may be removed from the playback history.

One having ordinary skill in the art will appreciate that the playback history 600 shown in FIG. 6 is for illustration purposes, and that other formats and structures for storing playback history are also possible. For instance, a playback history may also include a Playlist Name column with information identifying a playback history playlist that a respective media item is a part of. In one case, a separate entry may be recorded for each playback history playlist the respective media item is a part of.

A playback history playlist may include media items played by the media playback system between contextual points. One example of a contextual point is a change in content provider. In one example, if the media playback system begins playing content from a first service provider, and subsequently switches to playing content from a second service provider, the media items provided by the first service provider and played by the media playback system may form a playback history playlist. The playback history playlist may also be automatically named accordingly. For instance, if the playback of those media items in occurred on a Sunday morning, the playback history playlist may be named "Sunday Morning-Service Provider 1." In another instance, if the playback of those media items occurred in a Dining Room playback zone, the playback history playlist may be named "Sunday Morning-Dining Room," or further "Sunday Morning-Dining Room-Service Provider 1." Other information, such as any user profiles associated with the playback of the media items, any particular artists, albums, or genres, among others, associated with the played media items may be used in naming the playback history playlist. In one example, the names of the playback history playlist may be further modified by a user of the media playback system.

In addition to content provider changes, another contextual point may be a modification of a playback queue. In one example, if the playback queue is cleared, media items in the playback queue that were played (or not played, but otherwise would have been played had the queue not been cleared) may be recorded as a playback history playlist. In another example, if a playback queue was populated and curated using a first user profile, and a second user profile is used to modify the playback queue, media items in the playback queue as populated and curated by the first profile, prior to the modifications using the second user profile may be recorded as a playback history playlist.

In another example, if media items have been playing in a playback zone, and the playback zone is added to a zone group or broken up into different zones, media items that were played in the playback zone prior to the zone modifications may be recorded as a playback history playlist. In yet another example, if media items of a certain genre have been playing in a playback zone, a change to a different genre of media items being played in the playback zone may cause the media items of the certain genre to be recorded as a playback history playlist. Other examples are also possible.

In one example, all media items played by the media playback system may be identified in the playback history. In another example, only a subset of media items played by the media playback system may be identified in the playback history. In one case, similar media items played in a playback zone of the media playback system during a time frame may be identified and recorded in the playback history based on the similarities, while the other media items played in the playback zone are not recorded. For instance, if 46 out of 60 songs played in an afternoon are by the same artist and/or within the same genre, the 46 songs may be recorded in the playback history, while the remaining 14 songs are not recorded. In one case, a threshold percentage of media items played in a given time frame may be required to have some commonality for the media items to be recorded in the playback history. In one example, the threshold percentage may be 60%. As such, if only 34 out of the 60 songs played in the afternoon are by the same artist and/or within the same genre, the 34 songs may not be recorded in the playback history. However, if 37 out of the 60 songs played in that afternoon are provided by the same service provider, the 37 media items from the same service provider may be recorded in the playback history. Other examples are also possible.

b. Receiving a Request

At block 504, the method 500 involves receiving a request. The request may be a request for media items from the playback history. In one example, the request may be a request for media items played in one of the playback zones at a given time. In another example, the request may be a request for media items having specified metadata that were played over the given time. In further example, the request may be a request for media items having specified metadata that were played in one of the playback zones at the given time. Other examples are also possible.

In one example, the request may be provided via a controller interface for the media playback system. In one case, the controller interface may prompt a user to select one or more of a time frame, a playback zone, an artist, a genre, and an artist, among others, from available options. The available options may be determined based on the information in the playback history. For instance, referring to FIG. 6, available options for playback zones may include Living Room, Dining Room, and Office. In such a case, the received request may include these selections. In another case, if the playback history includes a Playlist Name column, the received request may include a selection of one or more playback history playlists. In one example, the request may be received via a controller interface for the media playback system that is provided on a controller device. In such a case, the controller device may forward or relay the request to a device/server. In other words, the request may be received via a controller device. In a further example, the request may be received via the controller device and/or a playback device in the media playback system. Other examples are also possible.

c. Based on the Request, Transmitting a Portion of the Playback History

At block 506, the method 500 involves based on the request, transmitting a portion of the playback history. In one example, block 506 may further involve identifying the portion of the playback history based on the request. Referring to FIG. 6, if the request indicates a playback zone of Living Room and a time frame of Sunday morning, the portion of the playback history may include media items Track 1, Track 3, Track 4, Track 5, Track 7, and Track 8. If the request indicates a genre of Genre 2, and a time frame of Saturday evening, the portion of the playback history may include media items Track 2 and Track 6. If the request indicates a time frame of Monday evening, a playback zone of Office, and a genre of Genre 1, the portion of the playback history may include media items Track 9 and Track 11.

In some cases, the request may indicate more than one available option within a category at a time. For instance, the request may indicate a genre of Genre 1, and a playback zone of Living Room OR Office. In this case, the portion of the playback history may include Track 1, Track 3, Track 4, Track 5, Track 7, Track 8, Track 9, and Track 11. As the playback history 600 is only illustrative, other examples of identified portions of the playback history according to vary specificities of the request are also possible.

In one example, transmitting the identified portion of the playback history may involve transmitting information associated with the media items identified in the portion of the playback history. The information may include one or more of metadata, and a service identification (if the media item was provided from a service provider), among others. In one case, the portion of the playback history may be transmitted to a controller device. The controller device may be a device on which the controller interface that prompted the user to provide the selections was provided. Accordingly, the controller interface may display information for the media items identified based on the request.

Media items in the portion of the playback history may be added to a playback queue associated with one or more of the playback zones of the media playback system. In one example, the media items may be added to the playback queue automatically upon identifying the portion of the playback history. In another example, the media items may be added to the playback queue in response to additional inputs via the controller interface.

In one case, the controller device may transmit the information for the media items to one or more playback devices in the one or more playback zones associated with the playback queue. In one instance, the controller device may first receive the information for the media items from playback devices and/or server devices maintaining at least the portion of the playback history, and subsequently transmit the information to the one or more playback devices after receiving the information. In another instance, the playback devices and/or server devices that maintain at least the portion of the playback history may transmit the information directly to the one or more playback devices in the one or more playback zones associated with the playback queue.

In another example, if portion of the playback history was played by a zone group in a previous playback zone configuration different from a current playback zone configuration, the current playback zone configuration may be modified to match the previous playback zone configuration including the zone group, and the media items may be added to the playback queue associated with the zone group. Other examples are also possible.

In some examples, the playback history may be accessible by anyone using the media playback system. In some cases, the playback history may further be accessible by users of other systems similar to the media playback system and in communication with the media playback system or associated server device. In some examples, a particular portion of the playback history may be associated with a specific user profile used to access the media playback system. As such, in some cases, the particular portion of the playback history may only be accessible by the specific user profile. Other examples are also possible.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the examples provided herein involve maintaining a playback history for media items played by a media playback system, and based on a request, providing portions of the playback history. In one aspect, a method is provided. The method involves maintaining, by a computing device, a playback history for media items played by a media playback system. The media playback system comprises one or more playback zones. The playback history comprises, for each of the media items, (i) an indication of a playback zone in which the media item was played, (ii) a time at which the media item was played, and (iii) metadata associated with the media item. The metadata comprises at least one of an album associated with the media item, a genre associated with the media item, and a track name associated with the media item. The method also involves receiving, by the computing device, a request, and based on the request, transmitting, by the computing device, a portion of the playback history. The portion of the playback history identifies media items played by one of the playback zones at a given time.

In another aspect, a computing device is provided. The computing device includes a processor, and memory having stored thereon instructions executable by the processor to cause the device to perform functions. The functions include maintaining, by a computing device, a playback history for media items played by a media playback system. The media playback system comprises one or more playback zones. The playback history comprises, for each of the media items, (i) an indication of a playback zone in which the media item was played, (ii) a time at which the media item was played, and (iii) metadata associated with the media item. The metadata comprises at least one of an album associated with the media item, a genre associated with the media item, and a track name associated with the media item. The functions also include receiving, by the computing device, a request, and based on the request, transmitting, by the computing device, a portion of the playback history. The portion of the playback history identifies media items played by one of the playback zones at a given time.

In yet another aspect, a non-transitory computer readable memory is provided. The non-transitory computer readable memory has stored thereon instructions executable by a computing device to cause the computing device to perform functions. The functions include maintaining, by a computing device, a playback history for media items played by a media playback system. The media playback system comprises one or more playback zones. The playback history comprises, for each of the media items, (i) an indication of a playback zone in which the media item was played, (ii) a time at which the media item was played, and (iii) metadata associated with the media item. The metadata comprises at least one of an album associated with the media item, a genre associated with the media item, and a track name associated with the media item. The functions also include receiving, by the computing device, a request, and based on the request, transmitting, by the computing device, a portion of the playback history. The portion of the playback history identifies media items played by one of the playback zones at a given time.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method of operating one or more servers of a computing system communicatively coupled to a media playback system having one or more playback zones that include at least one respective playback device, the method comprising:

storing, via the one or more servers of the computing system, a playback history for media items played by the media playback system, wherein the playback history comprises, for each of the media items, (i) an indication of a playback zone in which the media item was played, (ii) a time at which the media item was played, and (iii) metadata associated with the media item;

receiving, via a network interface of the one or more servers, a request for one or more media items played during a given time period by the one or more playback zones;

based on the request for the one or more media items played during the given time period by the one or more playback zones, transmitting, via the network interface of the one or more servers to the media playback system, a portion of the playback history identifying particular media items played during the given time period by the one or more playback zones, wherein transmitting the portion of the playback history causes an indication of particular media items played by the one or more playback zones during the given time period to be displayed by a graphical display of a controller device configured to control playback by the one or more playback zones, and wherein the controller device is different from the at least one respective playback device of the one or more playback zones;

receiving, via the network interface of the one or more servers from a given playback zone of the media playback system, a request to play back at least one of the particular media items played by the one or more playback zones during the given time period, wherein the request indicates uniform resource identifiers representing respective sources of the at least one of the particular media items, and wherein the at least one of the particular media items are in a playback queue on a playback device of the given playback zone; and in response to the received request to play back, causing, via the network interface of the computing system, one or more playback devices of the given playback zone to play back the at least one of the particular media items played by the one or more playback zones during the given time period from the respective sources of the least one of the particular media items represented by the uniform resource identifiers, wherein the one or more playback devices of the given playback zone playing back the least one of the particular media items comprises the one or more playback devices of the given playback zone playing back the playback queue.

2. The method of claim 1, wherein receiving the request for media items played during the given time period by the one or more playback zones comprises receiving a request for media items (i) played during the given time period in a particular playback zone of the one or more playback zones and (ii) having specified metadata.

3. The method of claim 1, wherein receiving the request further comprises receiving a request for one or more media items having specified metadata, and wherein the transmitted portion of the playback history further identifies the particular media items having the specified metadata.

4. The method of claim 1, wherein transmitting the portion of the playback history further causes the particular media items to be added to the playback queue of the given playback zone of the one or more playback zones.

5. The method of claim 1, wherein the one or more playback devices of the given playback zone playing back the least one of the particular media items comprises causing the one or more playback devices of the given playback zone to stream the particular media items from the respective sources of the least one of the particular media items represented by the uniform resource identifiers.

6. The method of claim 1, wherein the playback history comprises a zone group configuration for two or more playback zones that was formed during the given time period, and wherein the one or more playback devices of the given playback zone playing back the least one of the particular media items comprises forming the zone group configuration for the two or more playback zones to cause the two or more playback zones to play back the playback queue in synchrony.

7. A computing system comprising one or more servers, the one or more servers comprising:
- a network interface;
- a processor; and
- memory having stored thereon instructions executable by the processor to cause the computing system to perform operations comprising:
    - storing, via the one or more servers of the computing system, a playback history for media items played by a media playback system, the media playback system comprising one or more playback zones, wherein each of the one or more playback zones comprise at least one respective playback device, and wherein the playback history comprises, for each of the media items, (i) an indication of a playback zone in which the media item was played, (ii) a time at which the media item was played, and (iii) metadata associated with the media item;
    - receiving, via a network interface of the one or more servers, a request for one or more media items played during a given time period by the one or more playback zones;
    - based on the request for the one or more media items played during the given time period by the one or more playback zones, transmitting, via the network interface of the one or more servers to the media playback system, a portion of the playback history identifying particular media items played during the given time period by the one or more playback zones, wherein transmitting the portion of the playback history causes an indication of particular media items played by the one or more playback zones during the given time period to be displayed by a graphical display of a controller device configured to control playback by the one or more playback zones, and wherein the controller device is different from the at least one respective playback device of the one or more playback zones
    - receiving, via the network interface of the one or more servers from a given playback zone of the media playback system, a request to play back at least one of the particular media items played by the one or more playback zones during the given time period, wherein the request indicates uniform resource identifiers representing respective sources of the at least one of the particular media items, and wherein the at least one of the particular media items are in a playback queue on a playback device of the given playback zone; and
    - in response to the received request to play back, causing, via the network interface of the computing system, one or more playback devices of the given playback zone to play back the at least one of the particular media items played by the one or more playback zones during the given time period from the respective sources of the least one of the particular media items represented by the uniform resource identifiers, wherein the one or more playback devices of the given playback zone playing back the least one of the particular media items comprises the one or more playback devices of the given playback zone playing back the playback queue.

8. The computing system of claim 7, wherein receiving the request for media items played during the given time period by the one or more playback zones further comprises receiving a request for media items (i) played during the given time period in a particular playback zone of the one or more playback zones and (ii) having specified metadata.

9. The computing system of claim 7, wherein receiving the request further comprises receiving a request for one or more media items having specified metadata, and wherein the transmitted portion of the playback history further identifies the particular media items having the specified metadata.

10. The computing system of claim 7, wherein transmitting the portion of the playback history further causes the particular media items to be added to the playback queue of the given playback zone of the one or more playback zones.

11. The computing system of claim 7, wherein one or more playback devices of the given playback zone playing back the least one of the particular media items comprises causing the one or more playback devices of the given playback zone to stream the particular media items from the respective sources of the least one of the particular media items represented by the uniform resource identifiers.

12. The computing system of claim 7, wherein the playback history comprises a zone group configuration for two or more playback zones that was formed during the given time period, and wherein the one or more playback devices of the given playback zone playing back the least one of the particular media items comprises forming the zone group configuration for the two or more playback zones to cause the two or more playback zones to play back the playback queue in synchrony.

13. A tangible non-transitory computer readable medium storing instructions executable by one or more servers of a computing system to cause the computing system to perform operations comprising:
- storing, via the one or more servers of the computing system, a playback history for media items played by a media playback system, the media playback system comprising one or more playback zones, wherein each of the one or more playback zones comprise at least one respective playback device, and wherein the playback history comprises, for each of the media items, (i) an indication of a playback zone in which the media item was played, (ii) a time at which the media item was played, and (iii) metadata associated with the media item;
- receiving, via a network interface of the one or more servers, a request for one or more media items played during a given time period by the one or more playback zones;
- based on the request for the one or more media items played during the given time period by the one or more playback zones, transmitting, via the network interface of the one or more servers to the media playback system, a portion of the playback history identifying particular media items played during the given time period by the one or more playback zones, wherein transmitting the portion of the playback history causes an indication of particular media items played by the one or more playback zones during the given time period to be displayed by a graphical display of a controller device configured to control playback by the one or more playback zones, and wherein the controller device is different from the at least one respective playback device of the one or more playback zones;

receiving, via the network interface of the one or more servers from a given playback zone of the media playback system, a request to play back at least one of the particular media items played by the one or more playback zones during the given time period, wherein the request indicates uniform resource identifiers representing respective sources of the at least one of the particular media items, and wherein the at least one of the particular media items are in a playback queue on a playback device of the given playback zone; and in response to the received request to play back, causing, via the network interface of the computing system, one or more playback devices of the given playback zone to play back the at least one of the particular media items played by the one or more playback zones during the given time period from the respective sources of the least one of the particular media items represented by the uniform resource identifiers, wherein the one or more playback devices of the given playback zone playing back the least one of the particular media items comprises the one or more playback devices of the given playback zone playing back the playback queue.

14. The tangible, non-transitory computer readable medium of claim 13, wherein transmitting the portion of the playback history further causes the particular media items to be added to the playback queue of the given playback zone of the one or more playback zones.

15. The tangible, non-transitory computer readable medium of claim 13, wherein the one or more playback devices of the given playback zone playing back the least one of the particular media items comprises causing the one or more playback devices of the given playback zone to stream the particular media items from the respective sources of the least one of the particular media items represented by the uniform resource identifiers.

16. The tangible, non-transitory computer readable medium of claim 13, wherein the playback history comprises a zone group configuration for two or more playback zones that was formed during the given time period, and wherein the one or more playback devices of the given playback zone playing back the least one of the particular media items comprises forming the zone group configuration for the two or more playback zones to cause the two or more playback zones to play back the playback queue in synchrony.

17. The tangible, non-transitory computer readable medium of claim 13, wherein receiving the request for media items played during the given time period by the one or more playback zones further comprises receiving a request for media items (i) played during the given time period in a particular playback zone of the one or more playback zones and (ii) having specified metadata.

18. The tangible, non-transitory computer readable medium of claim 13, wherein receiving the request for media items played during the given time period by the one or more playback zones further comprises receiving a request for media items (i) played during the given time period in a particular playback zone of the one or more playback zones and (ii) having specified metadata.

\* \* \* \* \*